Dec. 14, 1937.  O. W. FISHER ET AL  2,102,311
ELECTRICALLY CONTROLLED VALVE MECHANISM
Filed May 17, 1935  2 Sheets-Sheet 1
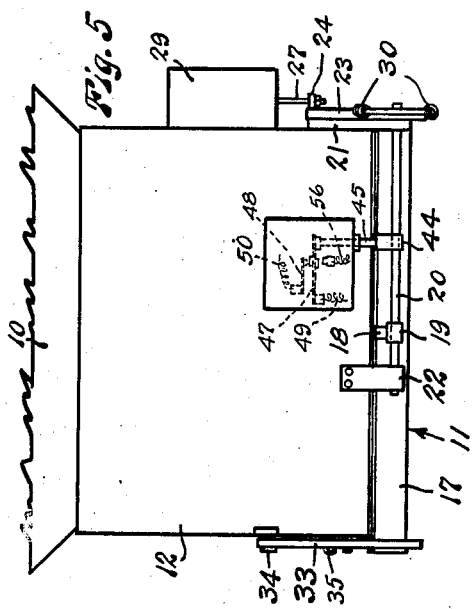
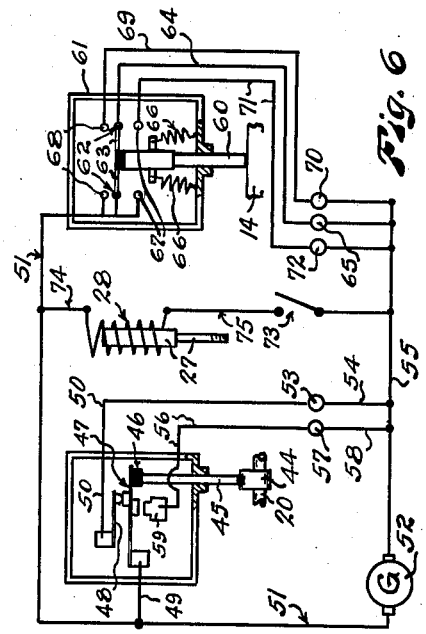
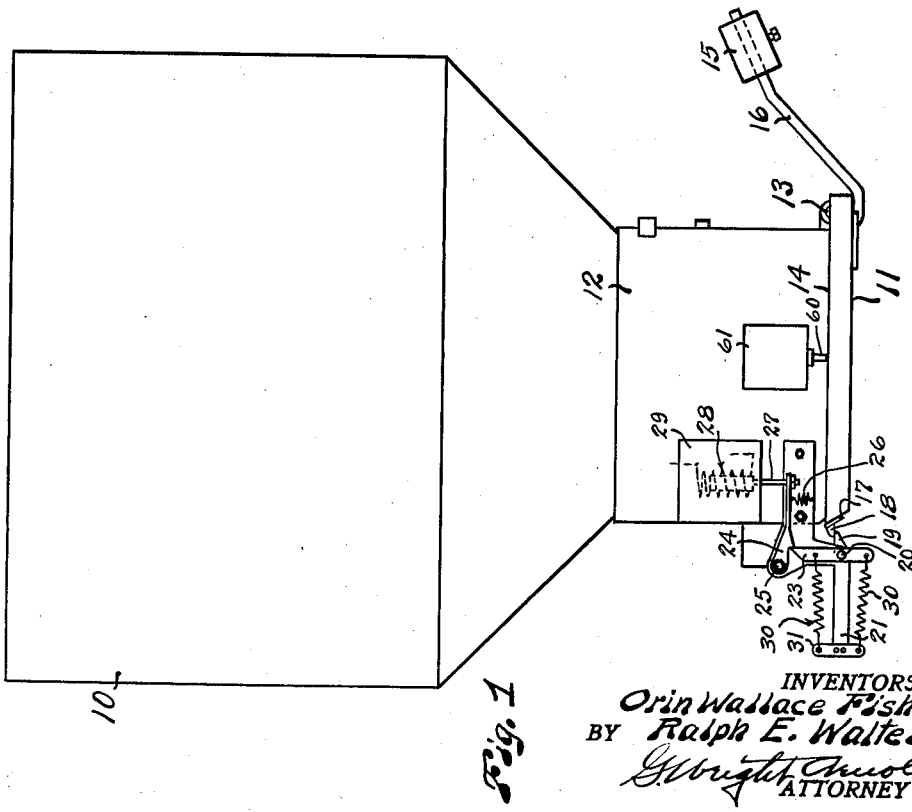
INVENTORS
Orin Wallace Fisher
BY Ralph E. Walter
ATTORNEY

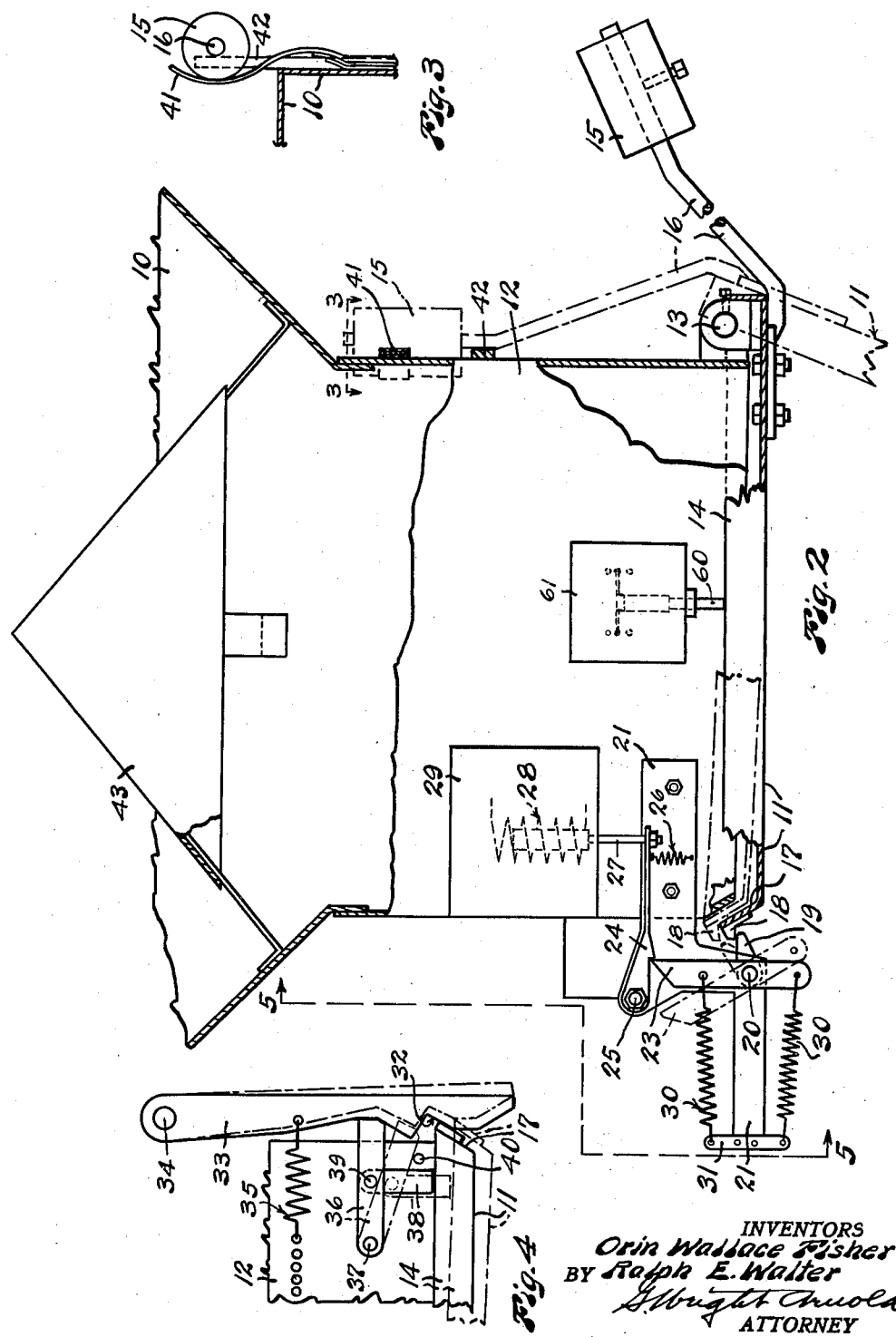

Patented Dec. 14, 1937

2,102,311

UNITED STATES PATENT OFFICE 2,102,311

ELECTRICALLY CONTROLLED VALVE MECHANISM

Orin Wallace Fisher and Ralph Edwin Walter, Seattle, Wash., assignors to Fisher Flouring Mills Co., Seattle, Wash., a corporation of Washington Application May 17, 1935, Serial No. 22,056

10 Claims. (Cl. 221—144)

This invention relates to an electrically controlled valve. More particularly, this invention relates to a valve used as a discharge gate from a hopper containing any material which will flow freely from one receptacle to another.

This application is a continuation in part of our application filed May 10, 1932 under Serial Number 610,414, issued December 3, 1935 under Number 2,022,659 and this invention is particularly applicable to the invention disclosed in said application.

A primary object of this invention is to provide a valve, for receptacles such as grain hoppers, arranged to be opened by the weight of the material resting on said valve upon the release of control means such as catch means.

Another object of our invention is to provide a hopper and valve mechanism therefor having electrical switches controlled by the position of the valve.

Another object of our invention is to provide indicating means positioned at any convenient location to indicate the operative condition of the hopper valve at all times.

Another object of this invention is to provide a valve extending, when open, across the path of discharge of material from the hopper and arranged so that the discharge of material will maintain the valve in such open position.

Another object of this invention is to provide counterweight means for such a valve, closing the valve when no material is discharging from the hopper.

Another object of this invention is to provide counterweight means so arranged that a minimum flow of material will maintain the valve open, and so arranged that the valve slowly closes permitting sufficient time delay for all material to flow past the valve.

Another object of this invention is to provide a valve having two closed positions, one when the valve is closed and no material rests thereon, and the other when the valve is closed and material rests thereon.

Another object of this invention is to provide a baffle means in association with a valve having two such closed positions so that the impact of falling materials will not move the valve to the closed and occupied position.

The above mentioned general objects of our invention, together with others inherent in the same, are attained by the device illustrated in the following drawings, the same being preferred exemplary forms of embodiment of our invention, throughout which drawings like reference numerals indicate like parts:

Figure 1 is a view in elevation of a hopper embodying the invention;

Fig. 2 is a view partly in elevation and partly in section, on a larger scale showing the lower portion, the upper portion being broken away, of the parts indicated in Figure 1;

Fig. 3 is a fragmentary plan view with parts in section, substantially on broken line 3—3 of Fig. 2, with the counterweights elevated;

Fig. 4 is a detached fragmentary elevation of a device positioned on the lower portion of the hopper on the side opposite to that shown in Fig. 2 and adapted to yieldingly resist movement of the valve from a closed and unoccupied position to a closed and occupied position;

Fig. 5 is a view in elevation substantially on broken line 5—5 of Fig. 2; and

Fig. 6 is a diagram illustrating electrical apparatus embodied in the invention.

Referring to Figure 1, 10 indicates a hopper for the storage of a free flowing material such as grain, and 11 indicates generally a valve therefor. In the application, of which this is a continuation in part, the hopper to which the valve was attached, was illustrated as a scale hopper. While the valve 11 is applicable as a discharge valve from the scale hopper, it is likewise applicable to other hoppers and in the present drawings the hopper is not confined merely to a scale hopper.

Referring particularly to Fig. 2, the hopper 10 is provided with a boot 12 which is open at the bottom and is adapted to be closed by the valve 11, which is pivotally mounted on a shaft 13. The valve 11 is preferably larger than the bottom of the boot 12, and is provided with upwardly turned edges 14, which extend over the outside of boot 12. Counterweights 15 are adjustably mounted on lever arms 16, which are fixedly secured to the valve 11, said counterweights serving to return the valve 11 to the closed position when no material is discharging from the boot 12. The edge 14 on the valve 11 on the opposite side from the pivot 13 is inclined as at 17 and is provided with a catch member 18 arranged to engage with a locking lug 19 on a shaft 20. The shaft 20 is journaled in a bracket member 21, which is secured to the boot 12 and in another bracket member 22, which is also secured to the boot 12 (see also Fig. 5). A holding member 23 is secured on the shaft 20 and is arranged to be engaged by a catch member 24, which is pivoted at 25 on the bracket member 21. A spring 26 urges the catch member 24 downwardly into an engaged position, and a plunger 27, operated by a solenoid 28 in a housing 29, is arranged to lift the said catch member 24 to release the holding member 23. Two substantially balanced tension springs 30, normally tending to retain the holding member 23 in an upright position, are anchored to a cross bar 31 on the outer end of the bracket member 21. When a load rests on the valve 11 and the catch member 24 is released, said valve will swing downwardly and permit the material in the hopper 10 to discharge. After said material has all discharged, the counterweights 15 will swing the valve 11 upwardly into closed position. As the valve 11 approaches the closed position, the catch member 18 engages the lower side of the locking lug 19 and raises said locking lug into the position shown by dot and dash lines in Fig. 2, at the same time tilting the holding member 23 into the dot and dash line position. When the locking lug 19 has reached such dot and dash line position, it will snap downwardly past the end of the catch member 18 and the holding member 23 will be angularly moved in a clockwise direction into engagement with the catch member 24, in which position locking lug 19 will be firmly supported, so that the catch member 18 may rest thereon and the valve 11 be supported thereby in a closed position.

When the valve 11 closes it will swing upwardly into the dot and dash line position shown in Fig. 2 and be in a position in which the catch member 18 is spaced above the locking lug 19, and will be held in this fully closed position by means including the mechanism shown in Fig. 4, until a predetermined weight of material rests on said valve 11 and moves the same downwardly into the full line position shown in Fig. 2. As shown by full lines in Fig. 4, when the valve 11 is fully closed, the front edge of said valve 11 will rest against an inclined surface 32 on a pawl 33, which is pivoted at 34 and urged toward the valve 11 by a spring 35, and it will require a predetermined weight on the valve 11 to overcome the force of the spring 35 and permit said valve 11 to move downwardly into the position shown by dot and dash lines in Fig. 4. To prevent the pawl 33 from resisting the closing of the valve 11, we provide a stop member 36 which is pivoted on the boot 12, as at 37, and is arranged to engage said pawl 33. A member 38 is connected by a pivot 39 with the stop member 36, and swings downwardly therefrom in a position to be engaged by the edge 14 of the valve 11. When the valve 11 is moved from the fully closed position shown in full lines in Fig. 4 to the occupied position shown by dot and dash lines in Fig. 4, the pawl 33 will be moved outwardly into the dot and dash line position, and the stop member 36 will move downwardly until it rests on a stop pin 40, in which position it will hold the pawl 33 outwardly clear of the edge of the valve 11, so that when the said valve again swings upwardly it will not frictionally engage the pawl 33, but will pass upwardly beyond the end of the pawl 33, will strike the member 38, lift the stop member 36 and release the pawl 33 after the inclined edge of the valve 11 is opposite the inclined surface 32, thereby avoiding frictional engagement between the edge of the valve 11 and the pawl 33 when the valve 11 is being closed. The mechanism shown in Fig. 4 is preferably positioned on the side of the boot 12 opposite to the mechanism shown in Fig. 2, as indicated in Fig. 5.

When the valve 11 swings downwardly into the open position and material is discharging from the hopper 10, the counterweights 15 will be swung upwardly into a position as shown by dot and dash lines in Fig. 2, which is slightly past a vertical line passing through the shaft 13, whereby the counterweights 15 will not tend to close the valve 11. However, in this position, the counterweights 15 engage with relatively light springs 41 (Fig. 3), which springs 41 exert a light outward pressure on said counterweights 15, said pressure being insufficient to start the closing of the valve 11, as long as any material is discharging from the hopper, but being strong enough to move the counterweights 15 back past the vertical line passing through shaft 13 as soon as all material has been discharged. Whereupon, the counterweights 15 will slowly cause the closing of the valve 11. The slow movement of the counterweights 15 as they are pushed back beyond the vertical line drawn through support 13, and the slowly accelerated movement as they fall farther and farther to the right of the support 13, provides a time delay feature which is ample to allow the last few particles of product such as grain to flow out of hopper 10. A stop bar 42 is secured to the boot 12 and extends into the path of the lever arm 16, so that the movement of the counterweights 15 will be stopped after the springs 41 have been flexed enough to give the outward pressure as above set forth.

Baffle member 43 is provided in the hopper 10 immediately above the boot 12 to prevent the impact of falling material on the valve 11, said baffle member 43 allowing the material to freely pass downwardly around the edges thereof.

Referring to Figs. 5, 6, and 2, the shaft 20 is journaled at one end in the bracket member 22, which bracket member is secured to boot 12. To shaft 20, locking lug 19 and holding member 23 are secured as previously described. A cam 44 is also secured on shaft 20 and is positioned so that its eccentric portion extends upwardly as shown in Fig. 5 when the holding member 23 is in upright locking position, as shown in Figs. 1 and 2. When this cam 44 is in the upright position it engages and lifts a switch plunger 45, which in turn engages with an insulated block 46 and lifts a spring contact member 47, thereby making contact with another spring contact member 48. This closes the circuit between electrical conductors 49 and 50 indicated by dotted lines in Fig. 5 and by full lines in Fig. 6. When the holding member 23 is in the locked position the electrical conductors 49 and 50 will be electrically connected.

The electrical conductor 49 is electrically connected to a main circuit wire 51 (Fig. 6). The main circuit wire 51 is electrically connected with a source of electrical energy, which source of electrical energy is herein illustrated by means of generator 52. The conductor 50 is connected with a signal means, such as a lamp 53, thence along conductor 54 and thence to the other main circuit wire 55. If this circuit is energized, lamp 53 will be illuminated, indicating that the holding member 23 is in the locked position.

When the holding member 23 moves to an unlocked position, as is illustrated by dot and dash lines in Fig. 2, the shaft 20 is angularly moved and the cam 44 is angularly moved so that the switch plunger 45 moves downwardly, thus permitting spring contact member 47 to move downwardly into contact with a contact member 59 and thereby causing an electrical connection between the electrical conductor 49 and the electrical conductor 56. When electrical conductors 49 and 56 are electrically connected, electrical energy passes from the source 52 along main circuit wire 51, along conductor 49, along conductor 56, through indicating means such as signal lamp 57, along conductor 58 and thence to the other main circuit wire 55. When the holding member 23 is in unlocked position, such position will be indicated by the illumination of signal lamp 57 by the electric circuit just described.

In the application, of which this is a continuation-in-part, the electrical switch means operated by the locking and unlocking of the valve, was indicated in Fig. 8 thereof. This switch was a single contact switch and provided an electrical circuit when the catch member was in locking position. In the present application, for the purpose of clearness, we have indicated an electrical circuit and signal means therefor when the catch member is in both the locked and unlocked positions.

It is obvious that the switch mechanism, which is operatively connected with the holding member 23, is responsive to the holding and locking means 23, 20 and 19, irrespective of the position of the valve 11, the object of this mechanism being to indicate whether or not the locking mechanism is in a locked position, and other means being provided for indicating whether the valve 11 is in open or closed position.

In the application, Serial No. 610,414, filed May 10, 1932, the electrical conductors 49 and 50 were interconnected with an automatic scale mechanism. For the purpose of illustration in the present case we have illustrated signal lamps 53 and 57. In the event that the described locking mechanism is in locked position, the signal lamp 53 will be illuminated, while if such locking mechanism is in unlocked position, the signal lamp 57 will be illuminated.

Referring to Fig. 2, the plunger 60 of the switch 61 is positioned to be engaged by the edge 14 of the valve 11 at a position in the upward travel of the valve 11 just previous to the time that the catch member 18 of the valve 11 contacts the locking lug 19, the plunger 60 being in its lowermost position prior to being first engaged by the edge 14. When the valve 11 is not in engagement with the plunger 60, the valve 11 is, therefore, in an open position. When the valve 11 is closed and a weight of material is present in the hopper of at least a predetermined amount, the valve 11 is in the full line position shown in Fig. 2. When the valve 11 is in the dot and dash line position, shown in Fig. 2, the valve is then closed and not occupied. As the valve moves upwardly and downwardly it also moves the plunger 60 with it during the part of the travel just described, and the switch 61 causes electrical connections in response to such movement of the plunger 60.

In Fig. 6 the plunger 60 is in its medial position, thus indicating that the valve is closed and the hopper is occupied. In this position electrical contact is made between main circuit wire 51, contact members 62 (said contact members 62 being electrically connected by brush contactor 63 secured to plunger 60), thence along conductor 64, through signal lamp 65 to the other main circuit wire 55. Signal lamp 65 is thus illuminated when the valve 11 is in the closed and occupied position.

When the valve 11 is in an open position, the plunger 60 is moved downwardly to its lowermost position by means of springs 66 so that the brush contactor 63 electrically connects contact members 67. When the valve 11 is fully closed, the plunger 60 is moved upwardly to its uppermost position and electrically connects contacts 68. In this position the valve 11 is closed and no material is present resting on the valve 11. As material is delivered into the hopper 10, as soon as a predetermined weight of material rests on the valve 11, the valve 11 will be moved from the uppermost position to its medial position, which medial position is shown in full lines in Fig. 2, in which position the plunger 60 is in the medial position shown in Fig. 6.

With the valve 11 in the closed and unoccupied position and the plunger 60 in its uppermost position, an electrical circuit is made, commencing with main circuit wire 51 through electrical contacts 68, which have been connected by brush contactor 63, thence along conductor 69 through signal means, such as lamp 70, to the other main circuit wire 55. Thus, when the valve 11 is closed and unoccupied, this will be indicated by the illumination of lamp 70.

When a predetermined weight of material rests on the valve 11, the valve 11 will be moved to the closed and occupied position and the plunger 60 will be moved to its medial position, and lamp 65 will be illuminated as previously described.

When the valve 11 is opened, the plunger 60 will move to its lowermost position and the brush contactor 63 will electrically connect contact members 67. In this open position of the valve 11 and the lowermost position of the plunger 60, an electrical circuit will be established, commencing with main circuit wire 51 through electrical contact members 67, which have been interconnected by the brush contactor 63, thence along electrical conductor 71, through a signal means, such as a lamp 72, and thence to the other main circuit wire 55. In this open position of the valve 11, and the corresponding position of the plunger 60, lamp 72 will be illuminated, indicating that the valve is in open position.

The opening of the valve 11 is accomplished by the operation of the solenoid 28, which in turn moves the plunger 27 upwardly, and thus moves upwardly the catch member 24 out of the path of travel of the holding member 23, permitting the holding member 23 to be angularly moved, and with it the catch member 18, thus permitting the valve 11 to move open by reason of the weight of material resting thereon. The solenoid 28 may be energized by means of a switch 73. Upon the closing of switch 73, an electrical circuit is established, which commences with main circuit wire 51, along conductor 74, through solenoid 28, along conductor 75, through switch 73, and thence to the other main circuit wire 55.

Summarizing the operation of the device, when no material is flowing out of the boot 12 and past the valve 11, the valve 11 will be closed by means of the counterweights 15. The valve 11 will move to the dot and dash line position shown in Fig. 2, which is the closed and unoccupied position. On closing, the catch 18 will angularly move the locking lug 19 and move past said locking lug 19. After the catch 18 has moved past the locking lug 19, the locking lug 19 and the holding member 23 will be angularly moved from the dot and dash line position shown in Fig. 2 to the position shown in full lines in Fig. 2, by reason of the tension springs 30. With the holding member 23 in the full line position shown in Fig. 2, the catch member 24 will prevent angular movement of the holding member 23 in a clockwise direction, as shown in Fig. 2, as long as the catch member 24 is in the full line position shown in Fig. 2. The catch member 24 will be in the full line position shown in Fig. 2 as long as the solenoid 28 is deenergized, which is responsive to the opening of switch 73, Fig. 6. With the switch 73 open, the valve 11, as has been described, will now be in a closed locked and unoccupied position. This will be indicated by the illumination of lamps 70 and 53. When a predetermined weight of material is delivered into the hopper 10 and the same rests on the valve 11, then the valve 11 will move downwardly from the dot and dash line position shown in Fig. 2, to the full line position shown in Fig. 2. In this position the valve 11 will be in the closed occupied and locked position. This position will be indicated by the illumination of lamp 65 and lamp 53.

Referring to Fig. 4, the mechanism for frictionally holding the valve 11 in the closed and unoccupied position and requiring a predetermined weight of material to move the same to the closed and occupied position is indicated. This mechanism indicated in Fig. 4 provides a friction contact between the inclined end of the valve 11 and the inclined surface 32 of pawl 33. In order to move the end of the valve 11 downwardly it is necessary to angularly move the pawl 33, which is resisted by spring 35. Thus, a predetermined weight is necessary on the valve 11 to move the same from the closed unoccupied and locked position to the closed occupied and locked position. It is to be further noted that material falling into the hopper strikes baffle member 43 so that the valve 11 is not moved to the occupied position by the impact of falling material, but is so moved when a predetermined weight of material rests on the valve 11.

When switch 73 is closed, the catch member 24 is angularly moved and the valve 11 is released. The material falling past the valve 11 will angularly move the valve 11 and cause the counterweights 15 to move into the dot and dash line position shown in Fig. 2, where said counterweights will engage the springs 41 (see Fig. 3) and the lever arm 16 will engage stop bar 42. In this position, a vertical line drawn through the center of gravity of the counterweights would pass to the left of support 13. Therefore, the counterweights tend to angularly move the lever arms 16 in a counterclockwise direction as respects Fig. 2. The relatively light springs 41 tend to move the counterweights 15 in a clockwise direction and provide a pressure turning the counterweights in this direction, which is a relatively light pressure. This pressure is not sufficient to angularly move the counterweights as long as any substantial amount of grain is being delivered from the boot past the valve 11. As soon as the material ceases flowing from the boot, the springs 41 urge the counterweights slowly in a clockwise direction as respects Fig. 2, and the counterweights 15 close the valve 11.

When the valve 11 was opened, the stop member 36 held the pawl 33 in the dot and dash line position shown in Fig. 4. The pawl 33 is maintained in this position until the closing of the valve 11. Upon the closing of the valve 11 the edges 14 of the valve 11 engage member 38, which is in the dot and dash line position shown in Fig. 4 and move the same to the full line position shown in Fig. 4. Thus, the means shown in Fig. 4 do not resist the closing of the valve and only frictionally resist the opening of the valve as the same moves from a closed unoccupied position to a closed and occupied position.

Obviously, changes may be made in the form, dimensions and arrangement of the parts of our invention without departing from the principle thereof, the above setting forth only preferred forms of embodiment.

We claim:

1. In mechanism of the class described, a hopper having a discharge opening in its lower portion; a valve operatively positioned across said discharge opening and arranged to be in the path of discharging material when open; movable counterweight means operatively connected with said valve tending to close said valve, said counterweight means moving to a substantially balanced position in which it exerts substantially no closing force on said valve when the valve is in a fully open position; and means positioned in the path of travel of said counterweight means engageable by said counterweight means when the counterweight means is in said substantially balanced position, said means affording a relatively light predetermined pressure urging the counterweight means out of balanced position, whereby a relatively light predetermined pressure tending to close said valve, when fully open, is provided.

2. In mechanism of the class described, a hopper having a discharge opening in its lower portion; a valve operatively positioned across said discharge opening and arranged to be in the path of discharging material when open; movable counterweight means operatively connected with said valve tending to close said valve, said counterweight means moving to a substantially balanced position in which it exerts substantially no closing force on said valve when the valve is in a fully open position; and relatively light pressure means urging the counterweight means out of said balanced position and thereby tending to slowly close the valve, whereby a relatively small discharge of material will maintain the valve open and the valve will slowly close after said discharge of material ceases affording a time delay for complete discharge of material.

3. In mechanism of the class described, a hopper having a discharge opening in its lower portion; a valve pivotally mounted for opening and closing movement relative to said discharge opening and arranged to be opened by the weight of material thereon; counterweight means, connected with said valve, moving the valve to closed position, said counterweight means moving to substantially a balanced position in which it exerts substantially no turning force on the valve when the valve is in a fully open position; and relatively light spring means yieldingly urging said counterweight means from said balanced position toward a valve closing position.

4. In mechanism of the class described, a hopper having a discharge opening in its lower portion; a valve pivoted at one edge thereof for opening and closing movement relative to said discharge opening, and arranged to be opened by the weight of material thereon; lever arm means connected with said valve and extending from the pivot in a direction substantially opposite to said valve; counterweight means carried by said lever arm means and urging said valve into a closed position, said counterweight means being positioned above the horizontal plane of the pivot when the valve is in closed position; stop means positioned to arrest the opening movement of said valve after the center of gravity of the counterweight means has passed the vertical plane of the pivot and before the valve has reached a vertical position, whereby the valve in fully open position is in the path of discharging material when the turning force exerted by the counterweight means is substantially at a balance; and yielding means exerting a predetermined force, when the valve is fully open, returning said counterweight means to an unbalanced position, tending to close said valve, whereby the valve may be maintained in fully open position by a predetermined discharge of material from said hopper.

5. In mechanism of the class described, a hopper having a discharge opening in its lower position; a pivotally mounted valve operatively positioned as respects said discharge opening, said valve tending to swing to an open position when material rests thereon, and tending to move to a closed position in the absence of material resting thereon; a pivotal locking lug positioned in the path of the movable end of said valve; a pivoted holding member connected with said lug; a selectively operable catch member engaging said holding member and preventing rotary movement in one direction thereof; resilient means connected with said holding member normally positioning said lug and said holding member in locking position; electrical switch means connected with said lug and said holding member and movable into and out of electrical conducting position by the rotary movement of said lug and holding member; and electrically operated means connected with said electrical switch means.

6. In mechanism of the class described, a hopper having a discharge opening; a valve positioned for opening and closing movement as respects said discharge opening, said valve having two closed positions and being operable by weight of material thereon; and yielding valve control means operatively connected with said valve resisting movement of said valve from one of said closed positions to the other closed position, said yielding valve control means being operated by a predetermined weight of material on the valve permitting movement of said valve from one closed position to the other closed position.

7. In mechanism of the class described, a hopper having a discharge opening; a valve, opened by the weight of material thereon, positioned for opening and closing movement as respects said discharge opening; releasable valve holding means positioned in the opening path of movement of the valve at a position below the fully closed position of the valve; and yielding means engaging said valve in its travel from its fully closed position to the position when it engages said valve holding means, whereby opening movement of the valve from the fully closed position to the position where it engages the valve holding means is yieldingly resisted.

8. In mechanism of the class described, a hopper having a discharge opening in its lower portion; a counterweighted valve normally assuming a closed position, pivoted at one edge thereof and positioned across said discharge opening whereby the weight of material in said hopper will rest on said valve; a pivoted locking lug engaging said valve in its downward travel at a position below its maximum raised position, thereby providing an occupied position for said valve; and yielding means engaging said valve in its downward travel between its maximum raised position and the position where said valve engages said locking lug, whereby downward movement of the valve between its maximum raised position and the position where it engages said locking lug is yieldingly resisted, thereby requiring a predetermined weight of material on the valve to move the valve to its occupied position.

9. In mechanism of the class described, a hopper having a discharge opening in its lower portion; a counterweighted valve normally assuming a closed position, pivoted at one edge thereof and positioned across said discharge opening, whereby the weight of material in said hopper will rest on said valve; a pivoted locking lug for said valve engaging said valve in its downward travel at a position below its maximum raised position, thereby providing an occupied position for said valve; a pawl frictionally engaging said valve in its downward travel between its maximum raised position and its occupied position; and means disengaging said pawl from said valve in the upward travel of said valve releasing said disengaging means, whereby frictional engagement between the said pawl and the said valve is obtained during the downward travel of the valve and frictional disengagement between such members is had during the upward travel of said valve.

10. In mechanism of the class described, a hopper having a discharge opening in its lower portion; a counterweighted valve normally assuming a closed position, pivoted at one edge thereof and positioned across said discharge opening, whereby the weight of material in said hopper will rest on said valve; a pivoted locking lug engaging said valve in its downward travel at a position below its maximum raised position, thereby providing an occupied position for said valve; yielding means engaging said valve in its downward travel between its maximum raised position and the position where said valve engages said locking lug, whereby downward movement of the valve between its maximum raised position and the position where it engages said locking lug is yieldingly resisted, thereby requiring a predetermined weight of material on the valve to move the valve to its occupied position; and baffle means in said hopper positioned immediately above said valve and in the path of travel of material to said valve, said baffle means being positioned to provide passageways around said baffle means, thereby establishing communication throughout said hopper with a deflecting means positioned in the path of travel of materials, whereby the impact of falling materials into said hopper is borne by the baffle means and such impact does not affect the valve and does not move the valve until a predetermined weight rests thereon.

ORIN WALLACE FISHER.
RALPH EDWIN WALTER.